United States Patent

[11] 3,601,551

[72] Inventor Vernon F. Weber
Elmhurst, Ill.
[21] Appl. No. 749,065
[22] Filed July 31, 1968
[45] Patented Aug. 24, 1971
[73] Assignee GTE Automatic Electric Laboratories, Incorporated

[54] TONE GENERATOR CONTROL CIRCUIT

1 Claim, 3 Drawing Figs.

[52] U.S. Cl. .......... 179/84 VF, 179/27 G, 307/18
[51] Int. Cl. .......... H04m 19/02
[50] Field of Search .......... 307/80, 84, 86, 85, 18, 23, 38, 39, 64, 65, 29, 70; 179/84 VF, 16 A, 84, 16 AA, 27 G, 84 R

[56] References Cited

UNITED STATES PATENTS

| | | | |
|---|---|---|---|
| 1,646,215 | 10/1927 | Place | 307/23 |
| 1,997,568 | 4/1935 | Coates et al. | 307/23 |
| 2,382,908 | 8/1945 | Petersen | 307/80 |
| 2,885,569 | 5/1959 | Schuh et al. | 307/29 |
| 3,339,079 | 8/1967 | Kessler | 307/86 |
| 2,740,845 | 4/1956 | Mills et al. | 179/84 |

OTHER REFERENCES

N. A. Newell and A. Weaver, " Single-Frequency Signaling System for Supervision and Dialing over Long-Distance Telephone Trunks, " Transactions of American Institute of Electrical Engineers, Vol. 70, Pt. 1, pp. 487–493, 1951.

C. A. Pahlbom, A. W. Horton and D. L. Moody, " Multifrequency Pulsing in Switching," Electrical Engineering, Vol. 68, June 1949, pages 505- 510.

*Primary Examiner*—Kathleen H. Claffy
*Assistant Examiner*—Randall P. Myers
*Attorneys*—Spencer E. Olson, K. Mullerheim, B. E. Franz and Robert J. Black

ABSTRACT: A circuit for controlling the application of precise tones to telephone lines for signaling purposes in a telephone switching system. Two or more tone generators are employed to share the total load presented with the present control circuit automatically switching, upon generator failure, the load associated with the inoperative generator to another generator, except when tone signal failure is induced by conditions such as shorting or grounding of the load.

PATENTED AUG 24 1971

3,601,551

SHEET 1 OF 2

INVENTOR.
VERNON F. WEBER

BY

AGENT

TONE GENERATOR CONTROL CIRCUIT

BACKGROUND OF THE INVENTION

1. Field of the Invention

The present invention pertains to generators of precise tone signals for use in a telephone switching system. More specifically, the present apparatus is a control circuit arrangement, that permits sharing of load requirements between several tone generators, with automatic load switching upon generator failure.

The need for precise tones for signaling in modern telephone systems has become increasingly important. Many modern telephone circuits include tone detectors as a portion of the switching circuitry; therefore, it is important that the source of such tones be dependable as well as accurate. Obviously, effective control of such generators and provision for maintaining continuity of tone signal availability to the telephone switching system is imperative.

2. Description of the Prior Art

Previous tone generator control systems were usually operated on a standby basis. That is to say, if two generators were provided in a telephone office, one would be operated under full load conditions and the other would remain idle until a failure in the first occurred. At such time as a failure occurred, transfer of the load to the idle generator would take place. In such instances an alarm is usually operated to signal the occurrence of the failure to repair personnel.

In systems like that outlined above, the second generator operates until a manual transfer takes place, or failure of the second generator occurs. At this time automatic transfer back to the first generator occurs, if that generator is operable. If the fault that caused loss of tone signals is not malfunction of the generator itself, but rather, a condition associated with the load, such as a short circuit or grounded lead, a form of oscillation occasioned by switching back and forth from one generator to the other takes place.

The use of tone generators at full load during operative periods is more demanding than if the generator is operated at half loads continuously, because of heat generated, heavy load starting, etc. Likewise, the investment in the standby tone generator is not fully realized because of its normally inoperative state. Here, too, electrical or mechanical difficulties frequently occur due to lack of usage of the standby generator.

SUMMARY OF THE INVENTION

The tone generator control circuit disclosed herein, permits initial distribution of the load formed by all the lines in the telephone exchange to be divided into two or more separate tone generator loads. Each tone generator employed has adequate capacity to handle at least twice the load nominally assigned to it. Therefore, upon failure of a generator it is within the capability of a functioning generator to assume the load of the failing generator. The present control circuit operates to detect generator failure, automatically switching the load of the inoperative generator to an operating generator.

In some instances tone signal failure is not the result of actual generator breakdown, but is caused by some condition associated with the load that renders the output of the tone generator unusable. Such conditions might be a short circuit across the load, or grounding of the leads extending to the load. Under these circumstances, it is undesirable to transfer the defective load to another generator. Accordingly, the present control circuit includes provisions for the detection of such condition, preventing transfer of the load to another tone generator.

To facilitate maintenance, visual indicators signifying tone generator failure, presence of ground on the load, and transfer of load, are included in the present circuit. Likewise, provision for extension of signals indicating these conditions to a maintenance or test center are included.

BRIEF DESCRIPTION OF THE DRAWINGS

FIG. 2, is a schematic diagram of tone generator control circuitry in accordance with the present invention.

DESCRIPTION OF THE PREFERRED EMBODIMENT

Characteristic tone signals employed for telephone signaling include dial tone, busy tone, reorder tone, ring back tone and call-waiting tone. The generation and distribution of all these tones is similar, with only the frequency and interruption rate of the various tones differing. Therefore, the use of the term "tone" in this description is used in an all-inclusive sense.

Figure 1:
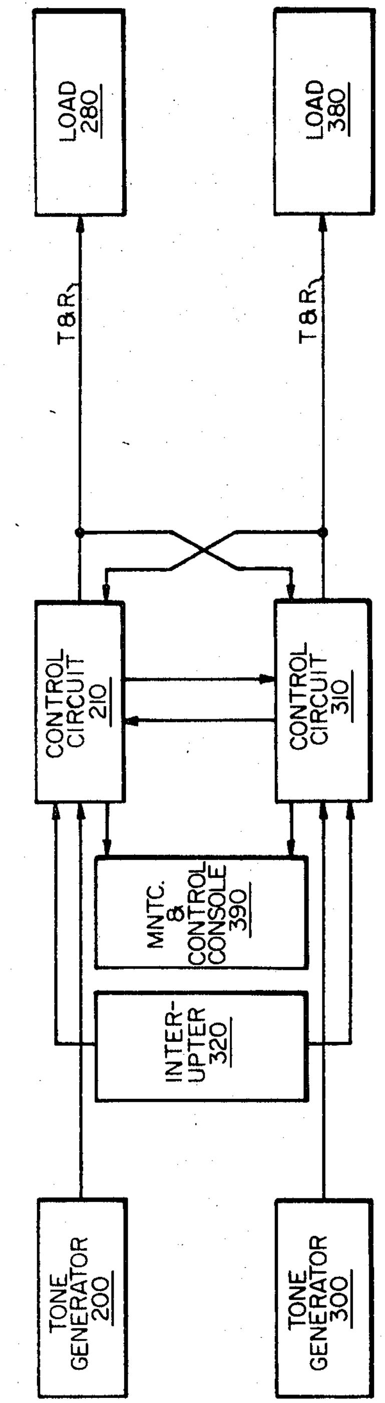
FIG. 1 is a block diagram of a tone signal distribution system embodying the present invention.

Referring first to the block diagram of FIG. 1, there is shown an arrangement for distribution of precise tone signals in a telephone exchange including two tone generators 200 and 300, both supplying the same type of tone to the loads 280 and 380, respectively. Each of these loads represents, in this particular instance, half of the circuits in a telephone office requiring a particular tone. Because of reliability considerations, two generators are used for each tone required. However, instead of placing one on an inactive standby basis, and switching it to the load, when the first one fails, both are used simultaneously. Although each generator is capable of supplying tone to the entire office, the load is split between the two. Thus when one generator fails the one remaining assumes the load of the failed one. This automatic switching in the case of generator failure is accomplished by the control circuits 210 and 310, respectively, wherein resides the novelty of the present invention. Control circuits 210 and 310 each detect failure of its associated tone generator and, in turn, transfer the associated load to the other or remaining generator.

It should be pointed out at this time that while a scheme employing two tone generators, two control circuits and a load divided into two portions is described here, it is fully within the scope of the present invention to further divide the total load constituting circuits requiring precise tones, into three, four or even larger groups. Accordingly, under these circumstances additional tone generators are provided on the basis of one tone generator for each load segment and an associated control circuit for each tone generator. Interconnection and transfer from one circuit to the other is in "ring fashion"; that is to say, that failure of a first generator will cause transfer of its associated load to a second generator, while failure of a second generator will cause transfer of its load to a third generator, and so on. Failure of the last generator in a group will result in transfer of its load to the first generator in the ground. The simplicity with which this may be accomplished is easily seen from the present description.

Also shown in FIG. 1 is an interrupter 320 that determines the interruption rate of tones being conducted from the tone generator to the associated load. For example, a 600-cycle tone such as might be generated by tone generator 200 might be interrupted at a fixed rate such as 60 times per minute. It is this interrupted signal that is conducted to the load, such as 280.

If tone generator 200 were to fail, this failure would be detected and load 280 would then be transferred through the interaction of control circuits 210 and 310, to tone generator 300, which will then assume distribution of tone through control circuit 310 to both load 280 and load 380. If such failure occurs, with the resultant transfer of loads, a signal indicating this failure will be visually indicated at the control circuit 210 as well as a visual indication that the transfer of load has occurred. Additional signals indicating these same conditions are also forwarded to the maintenance and control console 390 from the control circuits 210 and 310.

Under certain circumstances it may not be desirable to perform the transfer of loads as indicated above. These circumstances include the presence of ground on the leads extending to the load or a short circuit directly across the load. Under such circumstances a transfer will not occur. Each of the control circuits 210 and 310 is capable of detecting the presence of a short circuit or ground on the load leads and accordingly will inhibit transfer.

The presence of a grounded lead extending to the load or ground on the load itself will cause an appropriate visual indicator to be operated at the associated control circuit and at the maintenance and control console 390 for ready observation by repair personnel. The presence of a short across the load will cause operation of visual indicators at the control circuit and the maintenance control console the same as for generator failure.

As pointed out, under these conditions transfer of loads will not occur. However, the tone generator is disconnected from the load. If the fault is removed the circuitry of the control circuits, such as 210, 310 is automatically reset and the tone generator is reconnected to its normally associated load.

Figure 2:
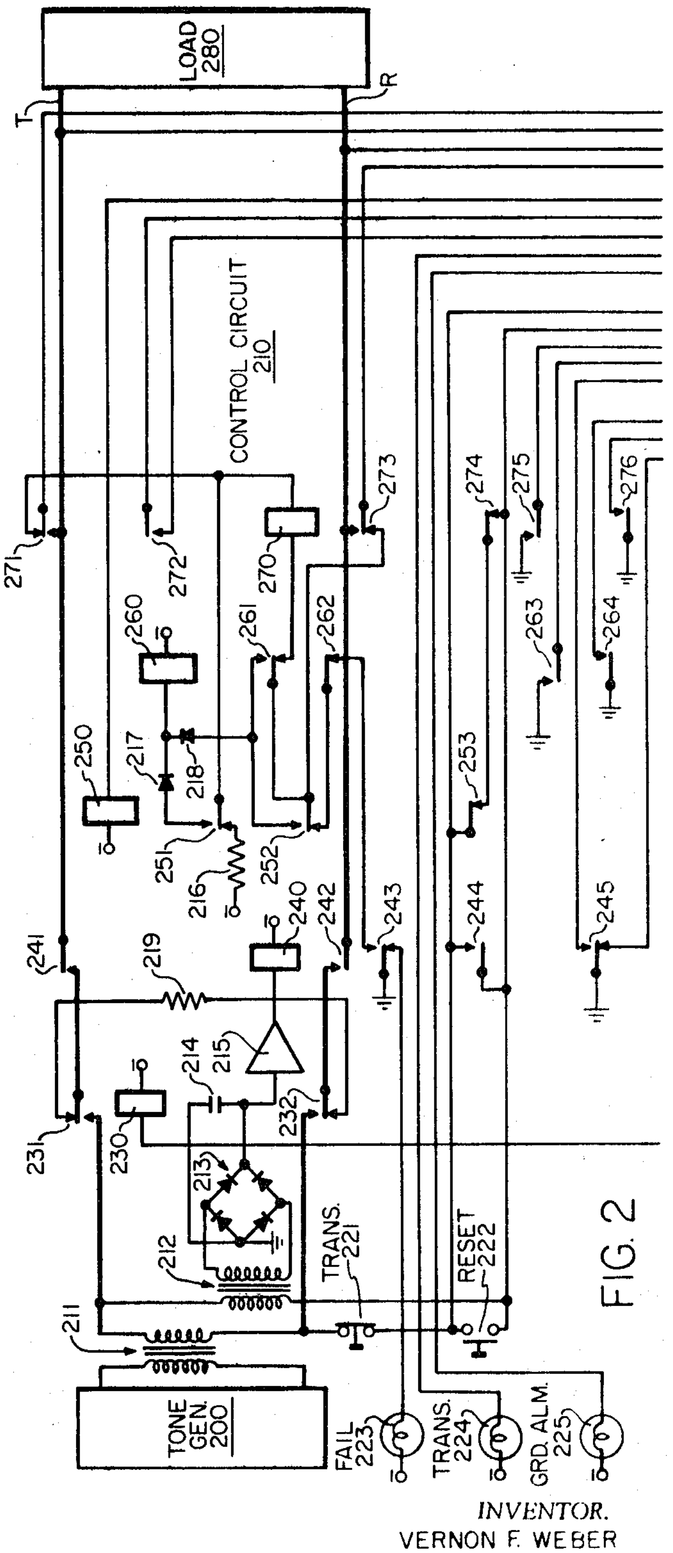
FIGS. 2 and 3 taken together, with FIG. 3 placed below
Figure 3:
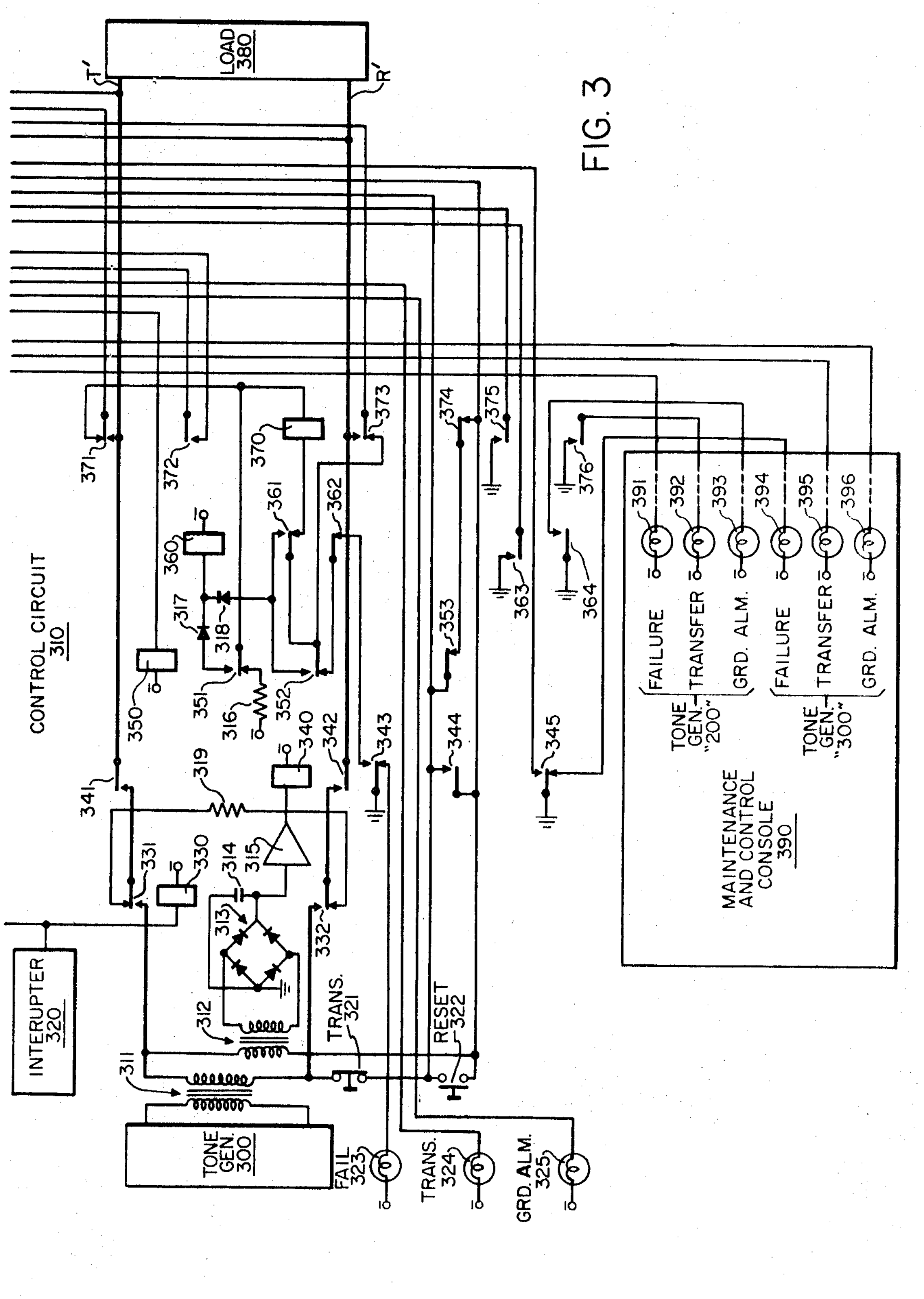

The control circuitry which forms the basis of the present invention is best understood by reference of the following description taken in connection with FIGS. 2 and 3 of the drawings.

Control circuits 210 and 310 are shown in FIGS. 2 and 3, respectively. These circuits are identical, each being associated with a particular tone generator, such as tone generators 200 and 300, respectively, and a particular load such as load 280 and 380, respectively. It should be pointed out that while the circuitry is identical, the interconnection between control circuit 210 and control circuit 310 are not multiples but rather specific connections the purpose of which will become apparent in the following description.

When control circuit 210 is initially placed in operation all of the relays are in their restored or nonoperative state. Soon thereafter, however, tone signals from tone generator 200 are coupled through transformer 211 to the primary of transformer 212; this latter connection is made through a path that includes break transfer key 221 and contacts 253 and 274 of relays 250 and 270, respectively. At the secondary of transformer 212 the signal is coupled to bridge rectifier 213 which operates to charge capacitor 214. As soon as capacitor 214 becomes fully charged a potential is extended to relay driver 215 (the circuitry of which may assume any well-known form) which, in turn, operates the failure detect relay 240. At contacts 241 and 242 associated with relay 240, the basic tone signaling path is extended to the load 280.

It will be noted that the interrupter relay 230 of FIG. 2 and interrupter relay 330 of FIG. 3 are both connected to common interrupter circuit 320 (which may be of any well-known type) to periodically operate the interrupter relays connecting the tone generators 200 and 300 through to the primary path extending to loads 280 and 380, respectively. The frequency of this connection is determined by the repetition rate associated with the particular tone being supplied.

At contact 243 ground will be removed from the failure lamp 223 associated with the operation of tone generator 200 and extended to break contacts 262 of ground alarm relay 260. A holding path for the circuitry operating the failure detect relay 240 is also provided at contacts 244. At contacts 245 ground is removed from the failure lamp 391 associated with tone generator 200 at the maintenance and control console 390 and placed on a lead extending to the preliminary transfer relay 350 of control circuit 310. In a similar manner, when control circuit 310 is placed in operation the corresponding relays will be operated and, in turn, the preliminary transfer relay 250 of control circuit 210 is operated.

At this time ground that was previously extended by relay 240 at its associated contacts 243 through contact 262 is broken from any further connection to the transfer relay circuitry of either control circuit 210 or 310, at contacts 252. Operation of relay 250 at contacts 251 prepares a ground detection path through ground alarm relay 260 and breaks the holding path at contacts 253, to the operating circuitry for failure detection relay 240. Relay 240, however, is maintained operated because of the holding path at contacts 244.

Thus, after both control circuits 210 and 310 have been placed in operation, tone from generator 200 is conducted through control circuit 210 to load 280, and tone from generator 300 is conducted through control circuit 310 to load 380. At this time the failure detection relays 240 and 340 are operated, as are the preliminary transfer relays 250 and 350. The ground alarm relays 260 and 360 and the transfer relays 270 and 370 are not operated at this time. As outlined previously the interrupt relays 230 and 330 will operate periodically to interrupt the tone signals being conducted from the tone generators to the associated load at a repetition rate determined by interrupter 320.

FAILURE OF A GENERATOR

If, for example, tone generator 200 fails, the lack of tone across the primary transformer 212, will through the previously outlined path, cause relay 240 to restore. The restoration of this relay, however, is not immediate because of the delay caused by the time constant of capacitor 214. After capacitor 214 discharges relay 240 restores, breaking the connection from tone generator 200 to load 280 at contacts 241 and 242. At contacts 243 ground is restored to the associated failure lamp of control circuit 210 to indicate failure of the tone generator and, likewise, ground is removed from the preliminary transfer relay 350 of control circuit 310 at contacts 245. This same ground is extended at contacts 245 to the failure lamp 391 associated with tone generator 200 at the maintenance and control console 390.

Removal of ground from relay 350 causes it to restore, extending at its contacts 351 battery, through resistance 316 to transfer relay 370, causing it to operate. The remainder of the operating path to relay 370 is through break contacts 361, break contacts 352, break contacts 362 and make contacts 343 associated with the failure detection relay 340 of control circuit 310.

Operation of relay 370 is effective at contacts 371 and 373 to connect load 280 to the output of tone generator 300, in parallel with load 380.

At contacts 372 a holding path for the failure detection circuitry of control circuit 210 is completed to anticipate the possible restoration to service of tone generator 200. Likewise, a holding path is removed for the failure detection circuitry associated with relay 340, at contacts 374. However, this relay remains operated by virtue of the completed holding path at contacts 344, as long as tone is available from tone generator 300. At contacts 375 a ground is extended to the lamp 224 indicating transfer of the load associated with control circuit 210, with a similar signal being extended by contacts 376 to the lamp 392 associated with tone generator 200 at the maintenance and control console 390. In this manner tone generator 300 supplies tone to both load 380 and transferred load 280.

SHORT CIRCUIT BETWEEN T AND R CONDUCTORS

The following description outlines operation of the present control circuits when a short circuit occurs across one of the loads. It will be assumed for purposes of this description that a short circuit exists between conductors T and R extending from control circuit 210 to load 280. Prior to the short circuit relays 240 and 250 of control circuit 210 are operative as are relays 340 and 350 of control circuit 310.

When the short circuit across conductors T and R occurs tone will disappear across the primary of transformer 212. Loss of tone at this point causes relay 240 to restore after the discharge period of capacitor 214, in a manner similar to that previously outlined. Likewise, in a manner similar to that previously outlined, the preliminary transfer relay 350 of control circuit 310 will restore and the failure lamps 223 at control circuit 210 and 391 at the maintenance and control console 390 will light. However, because of the short circuit across the T and R conductors, the transfer relay 370 which would normally operate to connect load 280 to control circuit 310 cannot operate, because the same short circuit exists across its coil. Therefore the shorted load will not be transferred and load 280 is isolated from both generators.

If the short across the T and R conductors extending to load 280 disappears or is removed, relay 370 will operate, effectively transferring the load 280 to control circuit 310. However, at this time tone would again reappear at the primary of transformer 212 and through the previously outlined circuitry, relay 240 would restore, reoperating preliminary transfer relay 350 in control circuit 310, removing the operating battery to transfer relay 370 causing it to restore, thereby reconnecting load 280 to control circuit 210. This latter operation is referred to an automatic reset.

The automatic reset feature is also effective in the case of restoration of a previously failed tone generator to reconnect the associated load to the restored generator by means of similar operation.

GROUND ON T OR R LEAD

Control circuit operation when a grounded condition occurs on either of the T or R leads extending between a control circuit and an associated load will now be described. As previously, the initial condition of both control circuits 210 and 310 will be to have their respective failure detect relays 240 and 340 operated, as well as relays 250 and 350.

Now, assuming that a ground condition occurs on lead T extending between control circuit 210 and load 280, the ground alarm relay 360 of control circuit 310 will be rendered operative over a path extending from the grounded T lead through the break contacts 371 associated with transfer relay 370 of control circuit 310, through make contact 351 of preliminary transfer relay 350, and through diode 317. An additional operating path for ground alarm relay 360 also exists through either terminating resistance 219 or the secondary of transformer 211 through contacts 232, 242 to the R conductor extending to load 280, through contacts 373 of control circuit 310 and through contacts 352 and diode 318 to relay 360.

Operation of relay 360 at contacts 361 opens the operating path for transfer relay 370, thus preventing transfer of load 280 to control circuit 310. Likewise, the ground operating path through contacts 362 to the transfer relay 370 are opened, and ground is extended at contacts 363 to the ground alarm lamp 225 associated with control circuit 210. At contacts 364 ground is extended to the ground alarm lamp 393 associated with tone generator 200 at the maintenance control console 390. Thus, in a manner similar to that for a shorted load, a ground on the T lead extending to a load will prevent transfer of the grounded load.

If a ground were present on the R lead extending from control circuit 210 to load 280 the operation would be identical, except that the ground would be extended through contacts 373, 352 and diode 318 to operate relay 360. Or, as an alternative, through the secondary of transformer 211 or resistor 219 and through the T lead extending to the load 280, through contacts 371, 351 and diode 317 to relay 360. Operation of relay 360 will have the same results as outlined above.

Removal of ground from either T or R leads extending to load 280 will cause restoration of relay 360 in control circuit 310. Since the load 280 is still connected to the tone generator 200 regular service will then be restored and the ground alarm lamps associated with control circuit 210 and the maintenance control console 390 will go out.

MANUAL TRANSFER AND RESET

As will be noted, both control circuit 210 and control circuit 310 each contain a transfer key and a reset key. Operation of these keys will now be discussed. If transfer key 221 is manually operated the path conducting signals from the secondary of transformer 211 to the primary of transformer 212 will be broken, causing loss of signal to failure detect relay 240. Failure detect relay 240 will now restore and in the manner previously described in connection with loss of tone from generator 200 the load 280 will be transferred to control circuit 310.

The reset key 222 in control circuit 210 is utilized to reenergize the control circuit when relay 240 is not operated, but relay 250 is operated under control of control circuit 310. By completing at its make contacts a circuit from the secondary of transformer 211 to the primary of transformer 212, reset key 222 is effective to complete a circuit for connecting tone from the tone generator 200, which is rectified and applied to the failure detect relay 240. In a manner similar to that previously outlined for operation of relay 240, signals from tone generator 200 will then be conducted to load 280.

The above description has concerned itself with the transfer of load 280 to the tone generator 300 under control of circuit 310. It is to be understood that failure of tone generator 300, a short across load 380 or ground on leads T′ to R′ would result in transfer of load 380 to tone generator 200 and control circuit 210 with the circuitry functioning in identical manner.

Maintenance and control console 390, shown as a stylized block and combination schematic diagram, is included by way of reference only, and is not intended to indicate the total scope of equipment that might be included in such a console. The lamp indicators shown would be for reference purposes only and therefore other circuitry might well be connected at the same point without departing from the intent of the present invention.

Other modes of operation of the instant control circuit required by combination of the fault conditions previously described, such as ground on T or R lead followed by failure of the tone generator; failure of the tone generator followed by ground on T or R leads; short circuits between T and R conductors after a load has transferred; failure of DC power to a tone generator, etc.; should be obvious from the previous description inasmuch as they merely combine circuit operations previously described. Such modes would thus fall fully within the scope of the present invention.

What is claimed is:

1. In a telephone system, a plurality of tone-signal-distributing subsystems connected in an endless ring, each subsystem including, a plurality of circuit connections to a preceding subsystem, a plurality of circuit connections to a succeeding subsystem, a tone signal generator, a load circuit, and a control circuit connected between said tone signal generator and said load circuit, said control circuit including: tone signal detection means connected to said included generator, operated in response to tone signals from said generator to complete a circuit connection for transmission of tone signals from said included generator to said included load circuit; and transfer means connected to said detection means of a preceding subsystem, operated in response to said preceding subsystem detection means detecting an absence of tone from said preceding subsystem generator, to complete a circuit connection for transmission of tone signals from said included generator to said preceding subsystem load circuit; each of said transfer means inhibited from completing said circuit connection between said included generator and said preceding subsystem load circuit, in response to a short circuit across said preceding subsystem load circuit.